US010630082B1

(12) United States Patent
Gu et al.

(10) Patent No.: US 10,630,082 B1
(45) Date of Patent: Apr. 21, 2020

(54) POWER COMMUNICATION TO REGULATE CHARGE OF UNMANNED AERIAL VEHICLE

(71) Applicant: Wing Aviation LLC, Mountain View, CA (US)

(72) Inventors: Kaiwen Gu, Sunnyvale, CA (US); Matthew Nubbe, Sunnyvale, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 16/182,397

(22) Filed: Nov. 6, 2018

(51) Int. Cl.
*H01M 10/46* (2006.01)
*H02J 7/00* (2006.01)
*B64F 1/36* (2017.01)
*B60L 53/31* (2019.01)
*B60L 53/60* (2019.01)

(52) U.S. Cl.
CPC ............ *H02J 7/0013* (2013.01); *B60L 53/31* (2019.02); *B60L 53/60* (2019.02); *B64F 1/362* (2013.01); *B60L 2200/10* (2013.01)

(58) Field of Classification Search
CPC ...... H02J 7/0021; H02J 7/0026; H02J 7/0008; H02J 7/0042; H02J 7/355
USPC ................. 320/104, 107, 114, 115, 132, 149
See application file for complete search history.

(56) References Cited

U.S. PATENT DOCUMENTS

| 9,362,768 | B2 | 6/2016 | Zhu et al. |
| 9,590,510 | B1 | 3/2017 | Sheng et al. |
| 9,647,475 | B2 | 5/2017 | Sun et al. |
| 9,673,651 | B2 | 6/2017 | Hawawini et al. |
| 2016/0347450 | A1 | 12/2016 | Raniere |
| 2017/0149257 | A1 | 5/2017 | Liu et al. |
| 2018/0257492 | A1* | 9/2018 | O'Hara ................... H02J 7/007 |
| 2019/0025830 | A1* | 1/2019 | O'Brien .................. B60L 53/38 |

FOREIGN PATENT DOCUMENTS

| CN | 101238626 A | 8/2008 |
| KR | 1020170061865 A | 7/2017 |
| WO | 2018141843 A1 | 8/2018 |

OTHER PUBLICATIONS

U.S. Appl. No. 15/654,644, filed Jul. 19, 2017.
Written Opinion and International Search Report dated Feb. 13, 2020 in corresponding International Patent Application No. PCT/US2019/058109, 9 pages.

* cited by examiner

*Primary Examiner* — Edward Tso
(74) *Attorney, Agent, or Firm* — Christensen O'Connor Johnson Kindness PLLC (57) ABSTRACT

In an embodiment, an apparatus includes a plurality of electrical contacts, wherein first and second electrical contacts of the plurality of electrical contacts electrically couple with a charging device; one or more rechargeable batteries configured to be charged from power received, via the first and second electrical contacts, from the charging device; and circuitry configured to obtain battery state information associated with the one or more rechargeable batteries during charging of the one or more rechargeable batteries and generate battery charge rate data based on the battery state information. At least one of the first and second electrical contacts is configured to transmit the battery charge rate data to the charging device, and the battery charge rate data is configured to be used by the charging device to regulate charging of the one or more rechargeable batteries.

20 Claims, 7 Drawing Sheets

POWER COMMUNICATION TO REGULATE CHARGE OF UNMANNED AERIAL VEHICLE

TECHNICAL FIELD

This disclosure relates generally to the field of energy storage, and in particular but not exclusively, relates to energy storage technologies for unmanned vehicles.

BACKGROUND INFORMATION

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver than is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instance may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles may be powered using, for example, stored electrical energy in rechargeable batteries. Components included in the unmanned vehicles associated with charging the rechargeable batteries add to the unmanned vehicles' weight. Designs that improve the efficiency and range of unmanned vehicles will expand their mission capabilities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for generation and use of power communication to regulate charge of unmanned aerial vehicles are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments described herein include an unmanned aerial vehicle (UAV), which refers to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and the like.

Figure 1:
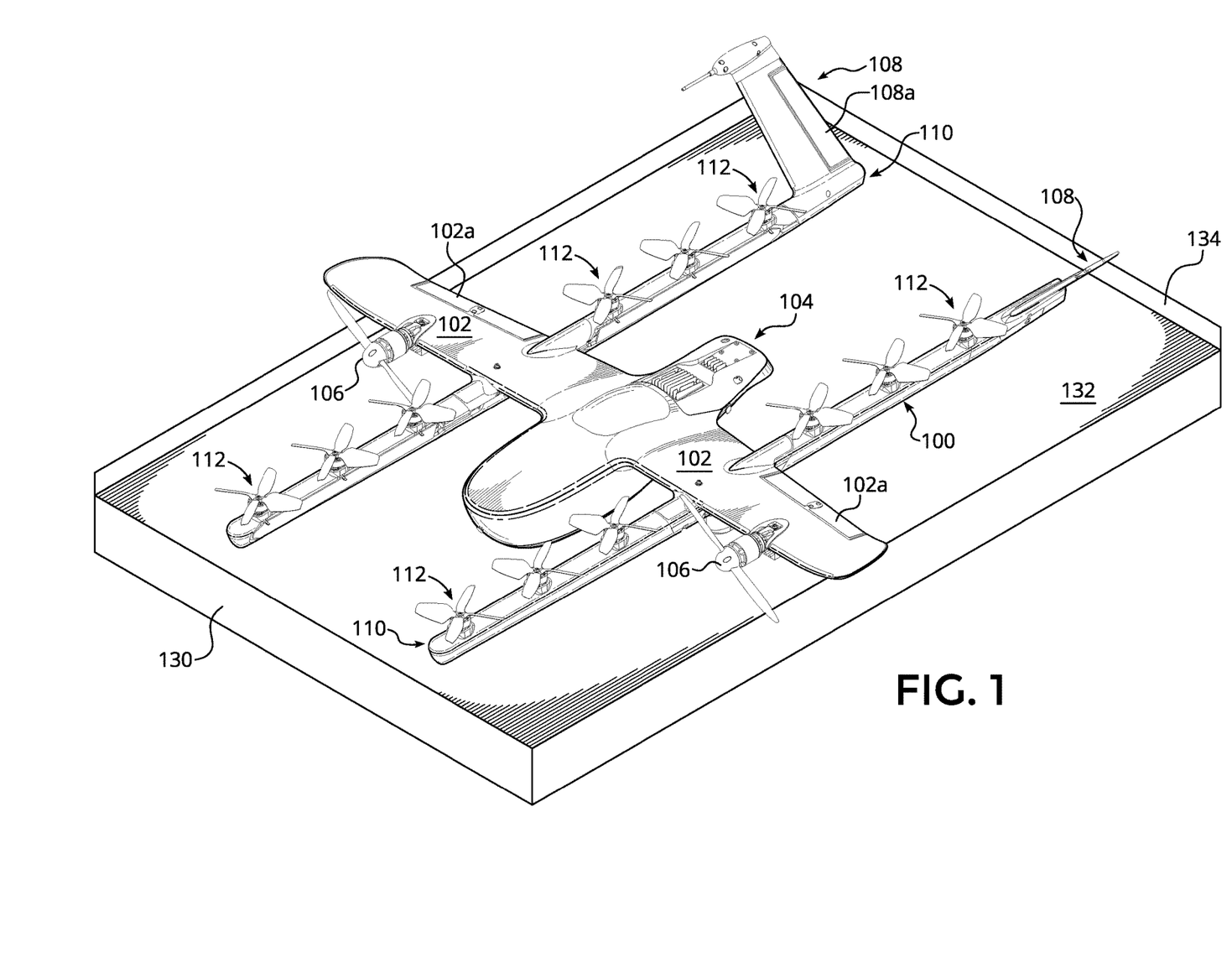
FIG. 1 is a perspective view illustration of a demonstrative UAV that has landed on a charging pad in accordance with some embodiments of the present disclosure.

FIG. 1 is a perspective view illustration of a demonstrative UAV 100 that has landed on a charging pad 130 in accordance with some embodiments of the present disclosure. UAV 100 comprises a fixed-wing UAV, which as the name implies, has a wing assembly 102 that can generate lift based on the wing shape and the vehicle's forward airspeed when propelled horizontally by cruise rotors 106. For instance, wing assembly 102 may have an airfoil-shaped cross section to produce an aerodynamic lift force on the UAV 100. The illustrated embodiment of UAV 100 is also a VTOL UAV, which includes hover rotors 112 to provide vertical propulsion.

UAV 100 also includes a fuselage 104. In some embodiments, fuselage 104 is modular and includes a battery module, an avionics module, a mission payload module, and a fuselage cover. These modules may be detachable from each other and mechanically securable to each other to contiguously form at least a portion of the fuselage or UAV main body.

The battery module includes a cavity for housing one or more batteries for powering UAV 100. The battery module also includes circuitry and/or components associated with charging, discharging, and/or regulating the one or more batteries, as described herein. The avionics module houses the flight control circuitry of UAV 100, which may include a processor and memory, communication electronics and antennas (e.g., cellular transceiver, Wifi transceiver, etc.), and various sensors (e.g., global positioning sensor, an inertial measurement unit (IMU), a magnetic compass, etc.). The mission payload module houses equipment associated with a mission of UAV 100. For example, the mission payload module may include a payload actuator for holding and releasing an externally attached payload. In another embodiment, the mission payload module may include a camera/sensor equipment holder for carrying camera/sensor equipment (e.g., camera, lenses, radar, lidar, pollution monitoring sensors, weather monitoring sensors, etc.). In yet another embodiment, the mission payload module may include an additional battery holder to house additional or larger batteries for extended flight times. Of course, the mission payload module may provide mixed use payload capacity (e.g., additional battery and camera equipment) for a variety of mix-use missions.

As illustrated, UAV 100 includes cruise rotors 106 positioned on wing assembly 102, which can each include a motor, shaft, and propeller, for propelling UAV 100 horizontally. The illustrated embodiment of UAV 100 further includes two boom assemblies 110 that secure to wing assembly 102. Hover rotors 112 are mounted to boom assemblies 110. Hover rotors 112 can each include a motor, shaft, and propeller, for providing vertical propulsion. Vertical propulsion units 112 may be used during a hover mode where UAV 100 is descending (e.g., to a delivery location), ascending (e.g., following a delivery), or maintaining a constant altitude. Stabilizers 108 (or tails) may be included with UAV 100 to control pitch and stabilize the UAV's yaw (left or right turns) during cruise. In some embodiments, during cruise, mode hover rotors 112 are disabled and, during hover mode, cruise rotors 106 are disabled. In other embodiments, hover rotors 112 are merely powered low during cruise mode and/or cruise rotors 106 are merely powered low during hover mode.

During flight, UAV 100 may control the direction and/or speed of its movement by controlling its pitch, roll, yaw, and/or altitude. Thrust from cruise rotors 106 is used to control air speed. For example, the stabilizers 108 may include one or more rudders 108a for controlling the UAV's yaw, and wing assembly 102 may include elevators for controlling the UAV's pitch and/or ailerons 102a for controlling the UAV's roll. As another example, increasing or decreasing the speed of all the propellers simultaneously can result in UAV 100 increasing or decreasing its altitude, respectively.

Many variations on the illustrated fixed-wing UAV are possible. For instance, fixed-wing UAVs may include more or fewer propellers, and/or may utilize a ducted fan or multiple ducted fans for propulsion. Further, UAVs with more wings (e.g., an "x-wing" configuration with four wings), are also possible. Although FIG. 1 illustrates one wing assembly 102, two boom assemblies 110, two forward propulsion units 106, and six vertical propulsion units 112 per boom assembly 110, it should be appreciated that other variants of UAV 100 may be implemented with more or less of these components.

In some embodiments, the underside of fuselage 104 includes a plurality of charging terminals (also referred to as charging contacts, charging couplers, charging pins, charge terminals, charge couplers, charge pins, or the like) configured to electrically couple the UAV 100 to the charging pad 130. UAV 100 can land on charging pad 130 in any position, orientation, rotation, translation, and/or offset relative to charging pad 130, as long as at least a subset of the plurality of charging terminals included in the fuselage 104 physically contacts a particular surface or portion of the charging pad 130. In the example illustrated in FIG. 1, the top surface of charging pad 130 comprises the surface/portion of the charging pad 130 to which the UAV 100 can make electrical contact with the charging pad 130. Such top surface of charging pad 130 may also be referred to as a landing terminal 132 or electrically active or contacting surface/portion of the charging pad 130.

The plurality of charging terminals of the fuselage 104 can include four charging terminals, for instance, and physical contact between at least any two of the four charging terminals and the landing terminal 132 is sufficient to establish electrical connection between UAV 100 and charging pad 130. With the electrical connection established, charging pad 130 can charge the battery(ies) included in the UAV 100, as will be discussed in detail below.

In some embodiments, charging pad 130 includes a housing that includes a lip 134 disposed on an outer perimeter of landing terminal 132. Lip 134 may prevent wind from causing UAV 100 to slide off charging pad 130. The housing of charging pad 130 also may include a skirt that surrounds landing terminal 132. The skirt may taper away from the center of charging pad 130, and prevent charging pad 130 from moving as UAV 100 lands or in windy conditions.

Other configurations of charging pad 130 are possible. For instance, instead of the charging terminal 132 comprising a flat surface, charging terminal 132 may comprise a non-flat surface, non-contiguous terminals, concave shape, convex shape, and/or the like. Alternatively, charging pad 130 may be omitted and UAV 100 may be configured to electrically connect to a power source and/or power transferring device via cable(s), wire(s), connector(s), or the like.

Figure 2:
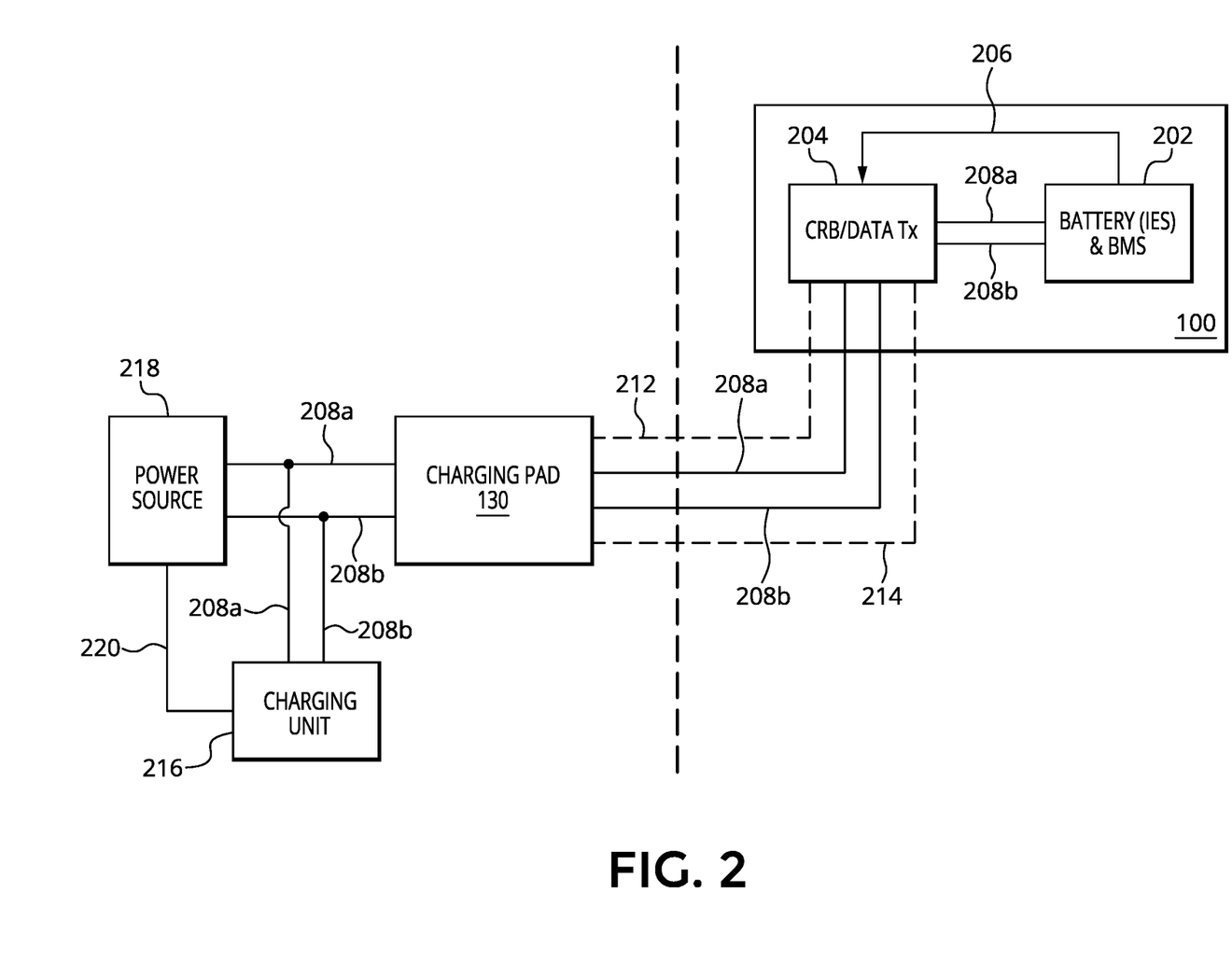
FIG. 2 depicts a block diagram showing components associated with generation and use of power communication to regulate charging of the UAV of FIG. 1 in accordance with some embodiments of the present disclosure.

FIG. 2 depicts a block diagram showing components associated with generation and use of power communication to regulate charging of UAV 100 in accordance with some embodiments of the present disclosure. In some embodiments, UAV 100 includes one or more rechargeable batteries electrically coupled to a battery management system (BMS), collectively referred to as battery(ies)/BMS 202, and a charging rectifier board (CRB) 204. BMS of battery(ies)/BMS 202 is configured to monitor various characteristics associated with the one or more rechargeable batteries and communicate corresponding battery state signals to CRB 204 on a line 206. Each of the BMS and CRB 204 can comprise an integrated circuit (IC) chip, and line 206 may comprise particular pins of the chip packages of the BMS and CRB 204 and a conductive trace (or other electrically conductive signal pathway) connecting such particular pins.

BMS and CRB 204 are also electrically coupled to each other via a pair of power lines 208a, 208b. As will be discussed below, power lines 208a, 208b comprise the polarized lines that carry the power provided by the charging pad 130 to charge the one or more rechargeable batteries. Power lines 208a, 208b comprise other particular pins of the chip packages of the BMS and CRB 204. Rest of the signal pathway associated with the power lines 208a, 208b from the CRB 204 to the charging pad 130, charging unit 216, and power source 218 are shown in FIG. 2.

In addition to power for charging the UAV 100 being transmitted on the power lines 208a, 208b, the same power lines 208a, 208b also transmit a charge rate signal generated by the CRB 204 to the charging pad 130. The charge rate signal is communicated from the charging pad 130 to the charging unit 216. Charging unit 216 is configured to process the charge rate signal, determine whether power provided to the UAV 100 is to be adjusted based on the charge rate signal, and send control signals (via a line 220) to the power source 218, as appropriate, to adjust the power supplied by the power source 218 to the UAV 100. With the supplied power characteristics adjusted, charge to the batteries is appropriately regulated. Such feedback loop continues to regulate battery charging for the duration of the charge session.

The charging unit 216 can thus regulate a charge curve associated with the one or more rechargeable batteries, top off charge in the batteries, extend the life of the batteries, engage safety protocols in cases, such as when the current is too high, trickle charge the batteries, start/stop component(s) included in the UAV 100 that will facilitate improved functionality of the batteries (e.g., start a heater in the UAV 100), and/or otherwise regulate charging of the batteries. Accordingly, battery charge regulation components (e.g., circuitry, chip, etc.) or functionality can be excluded or absent in the UAV 100 to save on weight, simplify design, reduce costs, and/or the like while still having the capability to have finely regulated battery charging including "smart" charging operations to reduce charging time via a remote/separate device such as the charging unit 216.

Power source 218 may comprise a direct current (DC) current-controlled voltage source and associated circuitry. Power source 218 may also be referred to as a power supply.

Charging unit 216 comprises a separate device from UAV 100, in some embodiments. Charging pad 130, charging unit 216, and power source 218 collectively may be referred to as a charging device. Charging pad 130, charging unit 216, and power source 218 may comprise a single device or more than one device. For example, charging pad 130 and charging unit 216 may comprise a first device and power source 218 a second device, charging unit 216 and power source 218 a first device and charging pad 130 a second device; charging pad 130, charging unit 216, and power source 218 together a single device; or the like.

A plurality of lines 208a, 208b, 212, 214 between CRB 204 and charging pad 130 correspond to the plurality of charging terminals or contacts included in the UAV 100. Two of the four plurality of charging terminals are electrically coupled to the charging pad 130 in FIG. 2, and correspondingly two of the four lines of the plurality of lines 208a, 208b, 212, 214 between UAV 100 and charging pad 130 (e.g., lines 208a and 208b) are deemed to be electrically active. If more than two charging terminals electrically couple to the charging pad 130, depending on landing position of the UAV 100 relative to charging pad 130, then more than two lines of the plurality of lines 208a, 208b, 212, 214 can be electrically active and used for carrying power to the batteries 300, 302 and simultaneously transmit charge rate information to charging unit 216.

Figure 3:
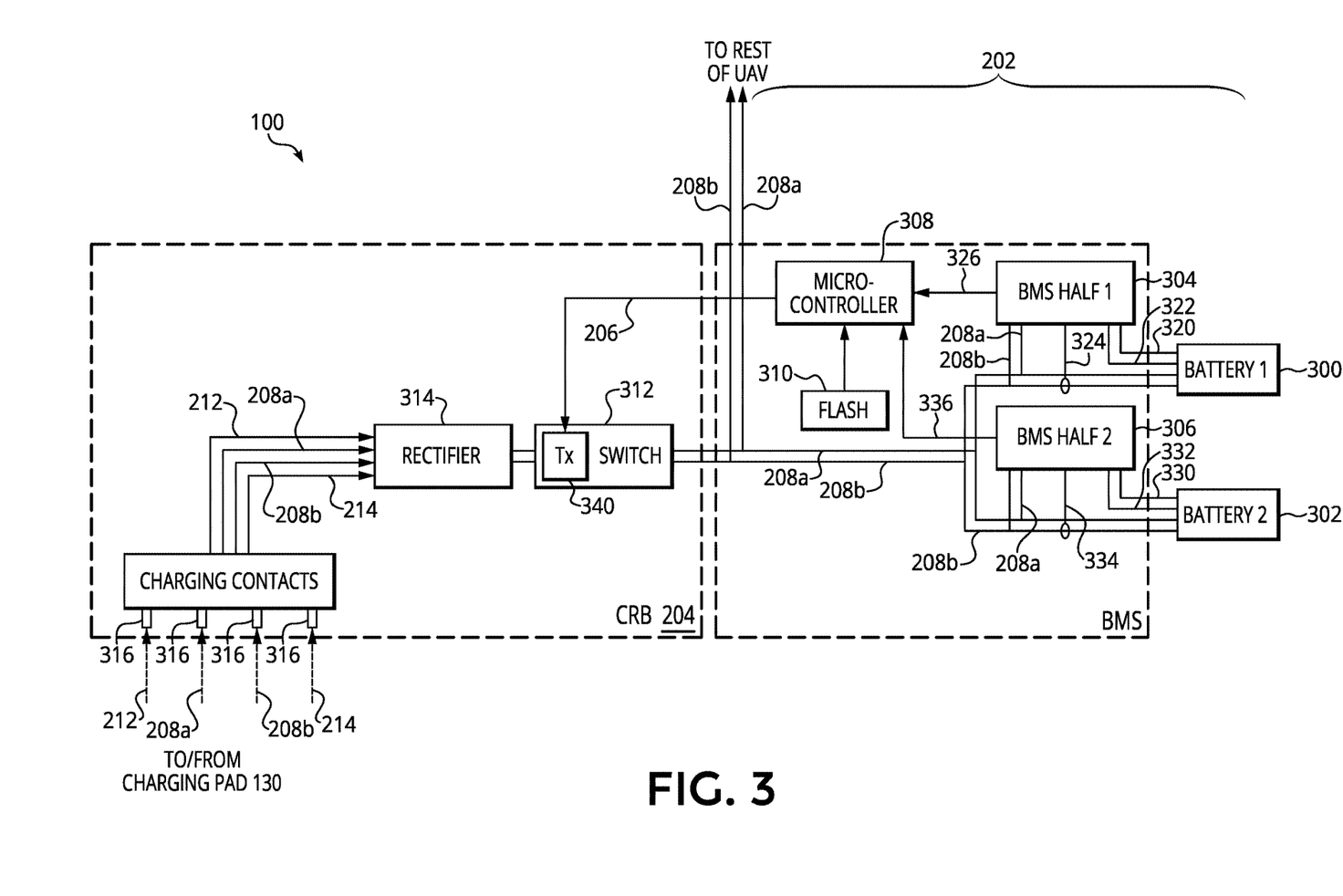
FIG. 3 depicts a block diagram showing components included in the battery(ies)/BMS and CRB in accordance with some embodiments of the present disclosure.

FIG. 3 depicts a block diagram showing components included in the battery(ies)/BMS 202 and CRB 204 in accordance with some embodiments of the present disclosure. Battery(ies)/BMS 202 includes, without limitation, a battery 300, battery 302, BMS 304, BMS 306, microcontroller 308, memory 310, switch 312, rectifier 314, and a plurality of charging terminals or contacts 316. Battery(ies)/BMS 202 may include additional components, such as a heater, heater controls, speaker, etc., which are not shown for ease of illustration.

Batteries 300, 302 comprise rechargeable batteries to be charged via particular voltage provided on power lines 208a, 208b from charging pad 130. Each of batteries 300, 302 may comprise one or more battery cells or packs. Batteries 300, 302 may comprise lithium (Li) ion batteries. Although two batteries are shown, it is understood that less or more than two batteries may be included in UAV 100.

Each of the batteries 300, 302 has an associated BMS. BMS 304 is associated with battery 300 and BMS 306 is associated with battery 302. BMSs 304 and 306 may comprise separate or a single component. In some embodiments, BMSs 304, 306 may comprise circuitry, electronic sub-components, electro-mechanical sub-components, electro-optical sub-components, mechanical sub-components, and/or the like. BMSs 304, 306 are configured to monitor parameters associated with charging of respective batteries 300, 302. Based on the monitored parameters, each of BMSs 304, 306 generates and transmits a battery state signal (also referred to as battery state information or data, battery charging information or data) associated with respective batteries 300, 302 to microcontroller 308 via respective lines 326, 336.

Microcontroller 308 is configured to generate a charge rate signal in accordance with the battery state signals from BMSs 304 and 306. Charge rate signal is transmitted on line 206 to switch 312. In some embodiments, switch 312 includes a transmit switch 340 (also referred to as a transmit component, charge rate signal transmit switch, or the like), and the information provided by the charge rate signal (e.g., present charge rate of the batteries 300, 302) is added or encoded for transmission along the power flow path (e.g., power lines 208a, 208b) by the transmit switch 340. The power, and more particularly, voltage carried on the power lines 208a, 208b to charge the batteries 300, 302 is changed, augmented, or supplemented to also include charge rate data. In some embodiments, the voltage magnitude is decreased in a specific pattern, as will be described below. For example, the voltage is changed by adding a discrete voltage drop of a specific pattern.

With batteries 300, 302 holding a constant voltage at the present point in time, the power line upstream (extending all the way to the power source 218) carries the added voltage drop, limited by the slew rate of the power source 218 and/or the size of output filter capacitors included in the power source 218. Hence, present battery charge rate information can be transmitted via charging terminals 316 corresponding to power lines 208a, 208b (e.g., V+ and V− pins of the CRB 204) and landing terminals of the charging pad 130 to be received by the charging unit 216. Power lines, pins, wires, etc. already in use to provide power to the batteries 300, 392 are also used to communicate with the charging unit 216—transmit charge rate data to the charging unit 216—without the need for additional lines, pins, wires, or communication pathways. In this manner, charge regulation functionalities for batteries 300, 302 included in UAV 100 are handled or controlled by a device other than UAV 100.

Memory 310 is in communication with microcontroller 308. Memory 310 may comprise flash memory. Memory 310 may store data for use by the microcontroller 308 and/or instructions or logic to be executed by microcontroller 308 to facilitate the power communication described herein. In alternative embodiments, memory 310 may be omitted.

When UAV 100 lands on the charging pad 130 and proper electrical contact is established between two or more charging terminals of the plurality of charging terminals 316 and landing terminal 132 of charging pad 130, a particular voltage (e.g., direct current (DC) voltage) is transmitted from power source 218 to those two or more charging terminals via charging pad 130. Voltage propagates along the particular power lines corresponding to the particular charging terminals having electrical contact with charging pad 130. Continuing the example, the particular power lines may be power lines 208a and 208b. Incoming voltage is received by rectifier 314. Because it is unknown beforehand the orientation or positioning of UAV 100 relative to landing terminal 132 or how many charging terminals of the plurality of charging terminals will make electrical contact with landing terminal 132, the polarity of the incoming voltage is indeterminate. Rectifier 314 is configured to determine the proper polarity of the incoming voltage. The polarity may be positive (+) and ground, negative (−) and ground, or positive (+) and negative (−).

The incoming voltage propagates from rectifier 314 (now polarized) to switch 312 and then continues from switch 312 to each of batteries 300, 302, along power lines 208a, 20b. Voltage provided by power source 218 is provided to batteries 300, 302 as is except for conventional losses associated with propagation through components and lines. UAV 100 does not modify or otherwise regulate the incoming voltage before providing to batteries 300, 302 because the incoming voltage already comprises a charge regulated voltage appropriate for that present battery charging state.

In some embodiments, CRB 204 may comprise circuitry, an IC chip, a printed circuit board (PCB), or the like. CRB 204 and BMS of battery(ies)/BMS 202 may be included in a single IC chip, single PCB, different IC chips, different PCBs, or the like.

Figure 4:
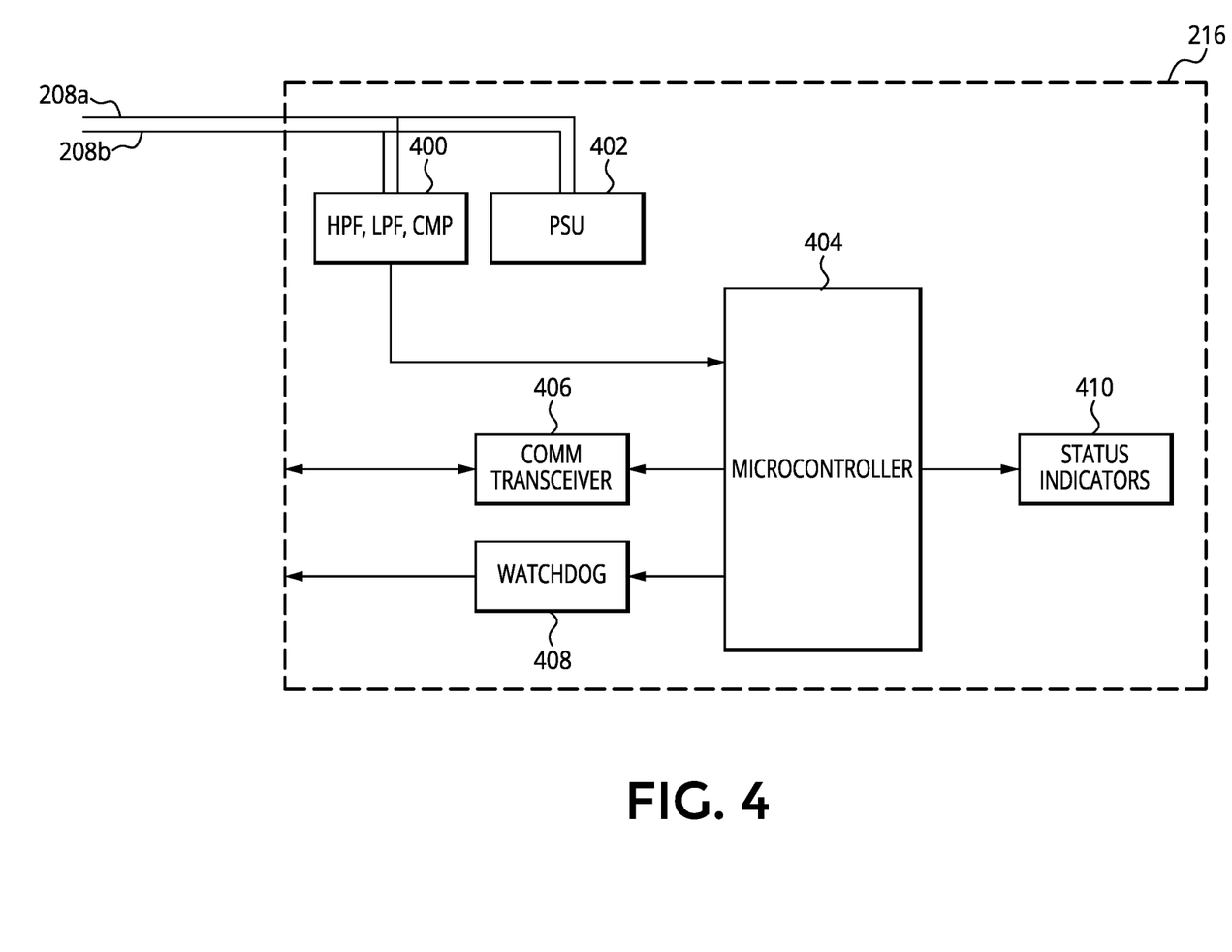
FIG. 4 depicts a block diagram showing components included in the charging unit in accordance with some embodiments of the present disclosure.

FIG. 4 depicts a block diagram showing components included in the charging unit 216 in accordance with some embodiments of the present disclosure. Charging unit 216 (also referred to as a charge regulation unit, charge controller, or the like) includes filters 400, a power supply unit (PSU) 402, a microcontroller 404, a communication transceiver 406, a watchdog 408, and status indicators 410. Microcontroller 404 is in communication with each of the filters 400, communication transceiver 406, watchdog 408, and status indicators 410. Each of the filters 400 and PSU 402 connects to the power line path (e.g., power lines 208a, 208b).

In some embodiments, filters 400 comprise one or more of a high pass filter (HPF), low pass filter (LPF), bandpass filter, Schmitt trigger, control monitor processor (CMP), and/or the like. One or more of the components included in filters 400 may comprise analog components. Voltage signal on the power lines 208a, 208b is processed by filters 400 to remove high frequency power supply noise (e.g., remove components above 10 kiloHertz (kHz)), remove standing DC voltage of the power lines (also referred to as the charging line), shift low voltage digital pulses to standard logic level signal values (e.g., 3.3 Volts (V) or 5 V), and/or the like. Filters 400 may be configured to be a data decoder of the charge rate data encoded in the voltage signal. The encoded charge rate data is better exposed or more clearly configured for use by microcontroller 404.

PSU 402 may comprise a power supply for the charging unit 216 or one or more components included in the charging unit 216.

Microcontroller 404 is configured to receive the processed voltage signal from filters 400 and analyze such signal to determine whether charge rate data is present, whether detected charge rate data is valid, the particular charge rate specified in the charge rate data, and/or other characteristics associated with the potential charge rate data, so as to generate an appropriate control signal to transmit to power source 218 via line 220.

Communication transceiver 406 is configured to receive one or more signals from the microcontroller 404, such as the control signal to be transmitted to the power source 218, and transmit such signal(s). Communication transceiver 406 may comprise a universal asynchronous receiver transmitter (UART).

Watchdog 408 is configured to detect and handle failures associated with the microcontroller 404. For example, the microcontroller 404 may be configured to send a periodic signal to the watchdog 408. If the periodic signal stops arriving or the periodic signal has characteristics that exceed pre-set parameters (such as when microcontroller 404 is malfunctioning), then watchdog 408 may be configured to power down at least the microcontroller 404, the power source 218, or the whole charging unit 216. Watchdog 408 may comprise hardware, firmware, and/or software.

Status indicators 410 are configured to visually, audibly, and/or otherwise indicate one or more status associated with the microcontroller 404 and/or of the charge rate data encoded in the power line. Continuing the above example, if microcontroller 404 is malfunctioning and watchdog 408 has shut down microcontroller 404, status indicators 410 may indicate the non-operational state of the microcontroller 404. As another example, the status indicators 410 may indicate the detection of charge rate data, etc.

Figure 5:
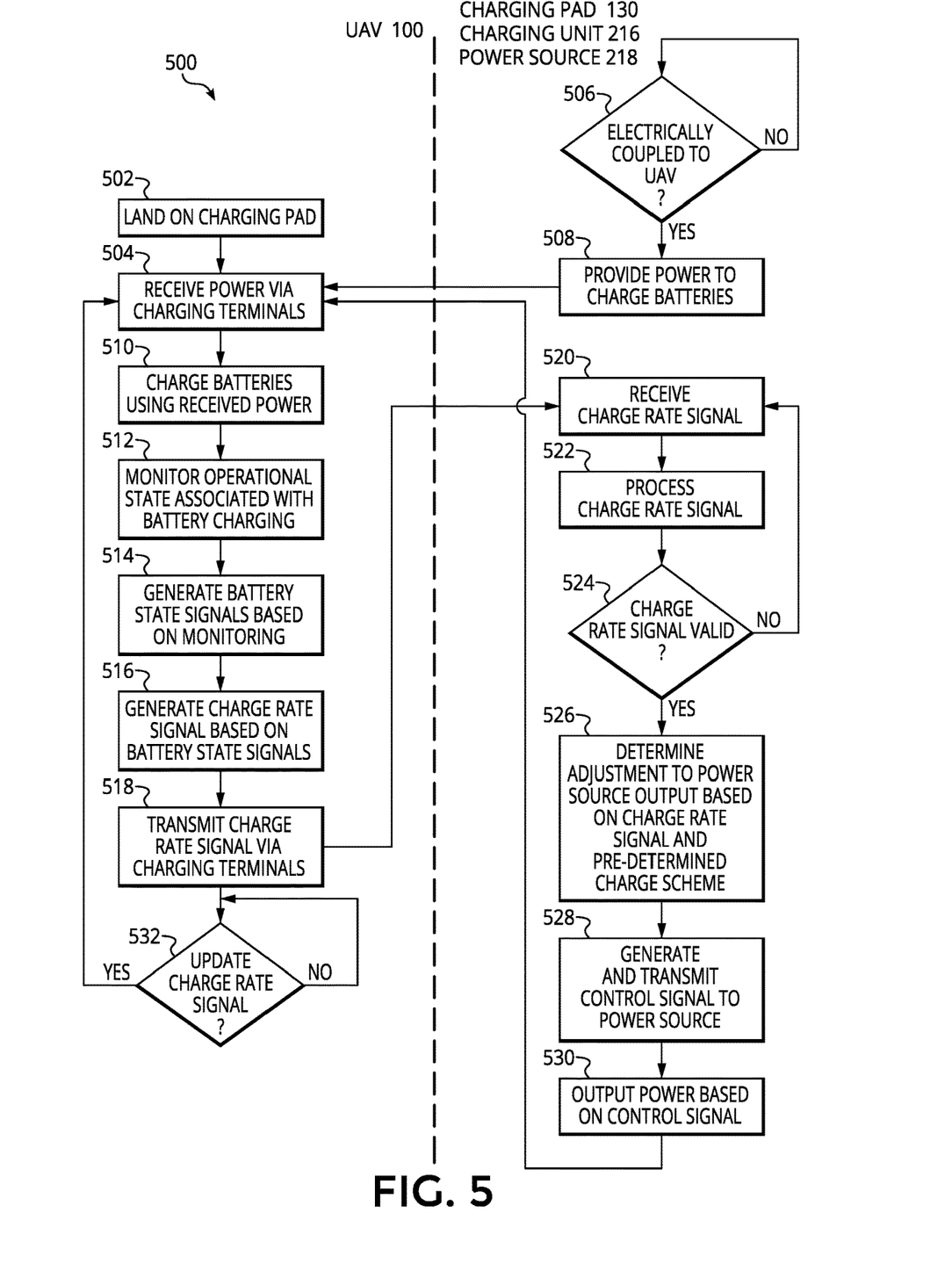
FIG. 5 depicts an example process for achieving battery charge regulation without inclusion of battery charge regulation components in the UAV and using the same lines/wires/conductive traces/pins as used for power transmission to batteries included in the UAV in accordance with some embodiments of the present disclosure.

FIG. 5 depicts an example process 500 for achieving battery charge regulation without inclusion of battery charge regulation components in the UAV 100 and using the same lines/wires/conductive traces/pins as used for power transmission to batteries 300, 302 included in the UAV 100 in accordance with some embodiments of the present disclosure. At block 502, UAV 100 is positioned to land on charging pad 130. As discussed above, UAV 100 lands on charging pad 130 so that at least two charging terminals 316 of UAV 100 establishes electrical contact with landing terminals 132 of charging pad 130.

The charging device, and in particular, charging pad 130 is configured to determine whether electrical coupling is properly established with UAV 100, at block 506. If electrical coupling is improper (no branch of block 506), then process 500 returns to block 506 to re-check for proper electrical coupling. If electrical coupling is proper (yes branch of block 506), then process 500 proceeds to block 508, in which power source 218 provides power (e.g., DC voltage of a certain magnitude) to the power transmission path (e.g., along power lines 208a, 208b). The power provided is appropriate to charge batteries 300, 302 in accordance with a pre-determined charging scheme (e.g., slow charge, quick charge, smart charge, timed charge, etc.).

Power provided by power source 218 at block 508 is received at the charging terminals 316 of UAV 100 in electrical contact with charging pad 130, at block 504. Incoming power propagates along the power transmission path to batteries 300, 302, as discussed above, thereby charging batteries 300, 302, at block 510.

With battery charging in progress, BMSs 304, 306 of UAV 100 are configured to monitor operational state(s) associated with respective batteries 300, 302, at block 512. Referring to FIG. 3, BMS 304 (which may also be referred to as BMS half or BMS half 1) is configured to monitor, sense, or detect, without limitation, the voltage level associated with battery 300 via a voltage sense line 320 between BMS 304 and battery 300, the temperature associated with battery 300 via a temperature sense line 322 between BMS 304 and battery 300, the current associated with power to be provided to battery 300 via a current sense line 324, and characteristic(s) of the power to be provided to battery 300 via branching of power lines 208a, 208b to BMS 304. Similarly, BMS 306 (which may also be referred to as BMS half or BMS half 2) is configured to monitor, sense, or detect, without limitation, the voltage level associated with battery 302 via a voltage sense line 330 between BMS 306 and battery 302, the temperature associated with battery 302 via a temperature sense line 332 between BMS 306 and battery 302, the current associated with power to be provided to battery 302 via a current sense line 334, and characteristic(s) of the power to be provided to battery 302 via branching of power lines 208a, 208b to BMS 306. Additional parameters associated with charging of batteries 300, 302 may also be monitored and/or derived by respective BMSs 304, 306 such as, but not limited to, configuring a fuel gauge, making determinations associated with charge or battery balance, etc.

Returning to FIG. 5, based on information gathered and/or derived at block 512, each of BMSs 304, 306 is configured to generate a battery state signal for its respective battery 300 or 302 and provide such signals to microcontroller 308 at block 514. Battery state signal may also be referred to as battery information or data, battery charging information or data, or any information or data pertaining to batteries 300, 302 which may be relevant for performance of battery charging.

Next, at block 516, the microcontroller 308 is configured to process the received battery state signals from BMSs 304, 306 and generate an appropriate charge rate signal. The charge rate signal specifies particular charge rate information or data to be encoded into the power transmission path (e.g., power lines 208a, 208b). Charge rate signal is provided to transmit switch 340.

Figure 6A:
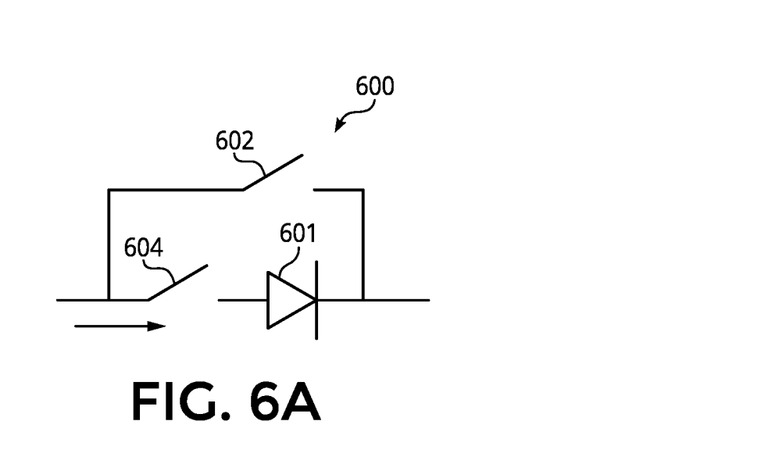
FIGS. 6A-6B depict example circuitry included in a switch in accordance with some embodiments of the present disclosure.
Figure 6B:
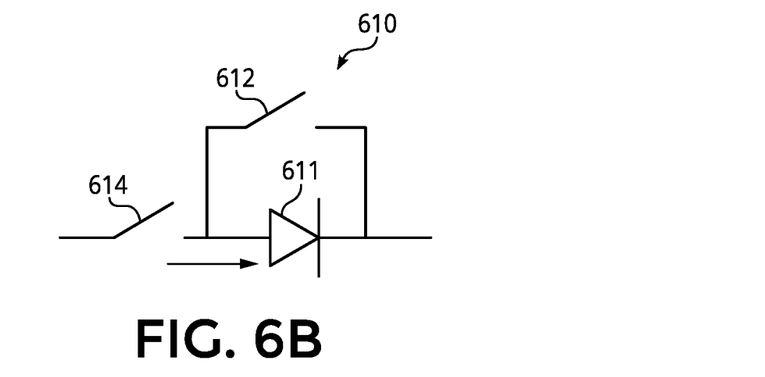

Switch 312, in response, is configured to encode the charge rate data to the power transmission path, thereby transmitting the charge data data/signal/information via the (electrically connected) charging terminals 316 upstream to charging unit 216, at block 518. FIGS. 6A-6B depict example circuitry 600, 610, respectively, included in switch 312 in accordance with some embodiments of the present disclosure.

In FIG. 6A, circuitry 600 includes a diode 601, a first switch 602, and a second switch 604. Second switch 604 and diode 601 are connected in series with each other. First switch 602 is connected in parallel with second switch 604 and diode 601. The arrow indicates the direction of current associated with power provided to batteries 300, 302. In some embodiments, diode 601 and second switch 604 comprise the transmit switch 340.

If first and second switches 602, 604 are open, then no current flows and power is not transmitted to batteries 300, 302. If first switch 602 is closed, then current flows via first switch 602 and there is no charge rate data encoding to the power transmission path. This is the switch configuration during time periods between charge rate data encoding, as will be described in detail below. If charge rate signal is provided to transmit switch 340 from block 516, then first switch 602 is opened and second switch 604 is closed. Now current flows through second switch 604 and diode 601 rather than through first switch 602. Diode 601 is configured to force power source 218 to increase its output voltage in order to maintain constant current operation, which manifests as a drop (or step up) in the voltage signal in the power transmission path. There may be a mix of less current and higher voltage, although the voltage is associated with the usable signal. In some embodiments, diode 601 induces a 0.3 to 0.6 V drop (or step up). And the diode 601 may also be referred to as a shunting diode.

Circuitry 610 of FIG. 6B comprises an alternative to circuitry 600. Circuitry 610 includes a diode 611, a first switch 612, and a second switch 614. First switch 612 and diode 611 are connected in parallel to each other. Second switch 614 is connected in series with first switch 612 and diode 611. The arrow indicates the direction of current associated with power provided to batteries 300, 302.

If first and second switches 612, 614 are open, then no current flows and power is not transmitted to batteries 300, 302. If first and second switches 612, 614 are closed, then no charge rate data is encoded to the power transmission path. This is the switch configuration during time periods between charge rate data encoding, as will be described in detail below. If charge rate signal is provided to transmit switch 340 from block 516, then first switch 612 is opened and second switch 614 is closed. Now current flows through second switch 614 and diode 611. Diode 611 is configured to add a voltage drop (or step up) to the voltage in the power transmission path. In some embodiments, diode 611 induces a 0.3 to 0.6 V drop (or step up). And the diode 611 may also be referred to as a shunting diode.

Figure 7:
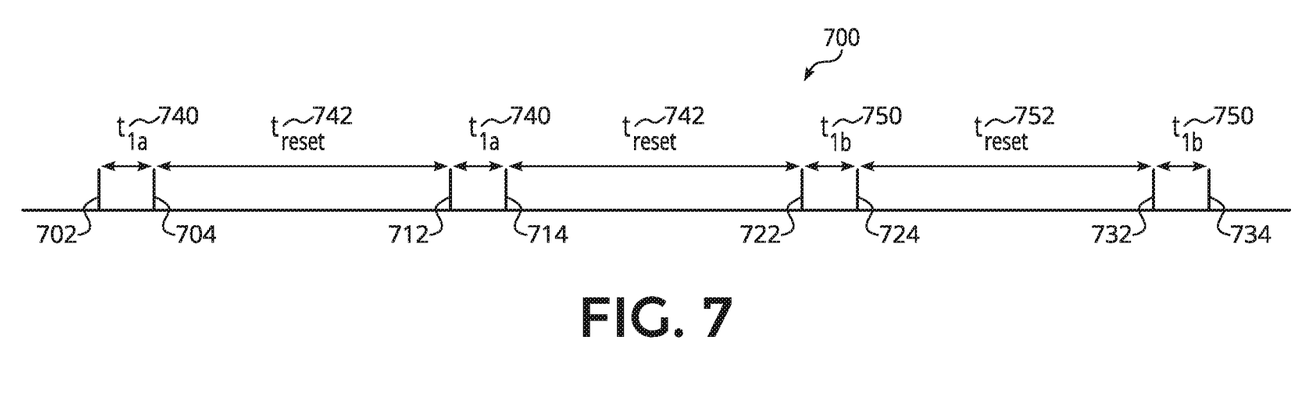
FIG. 7 depicts an example encoding scheme of the charge rate data in accordance with some embodiments of the present disclosure.
Figure 8:
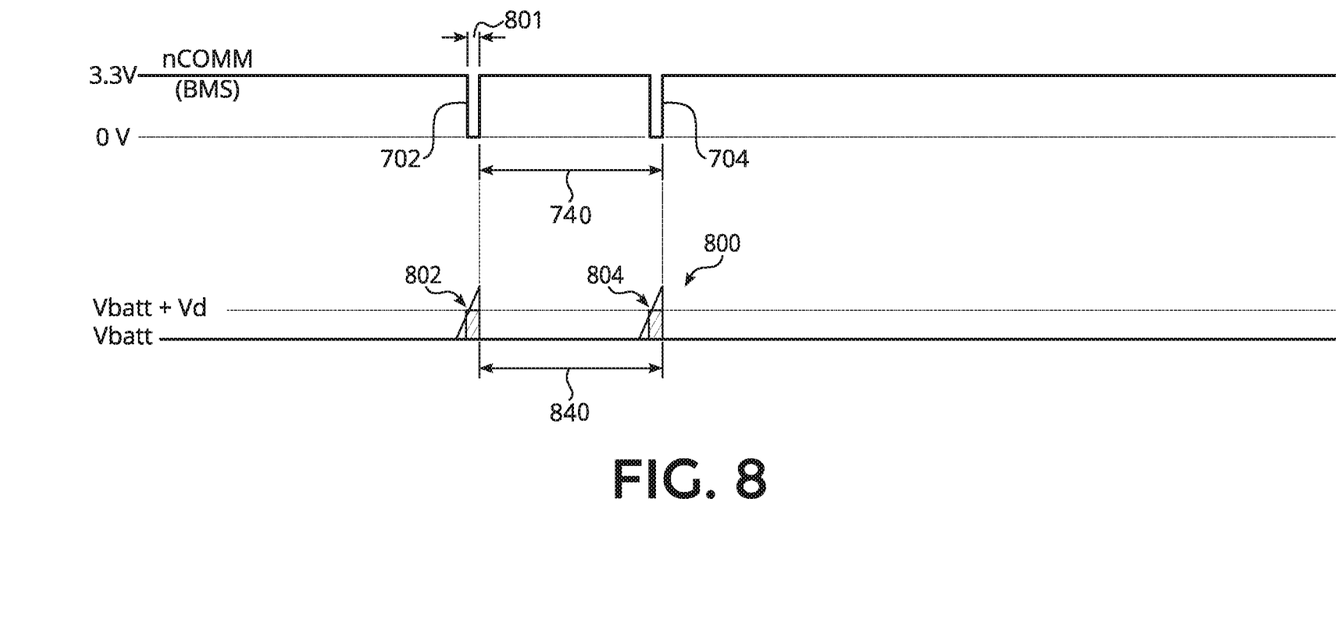
FIG. 8 depicts example charge rate data encoding waveforms in accordance with some embodiments of the present disclosure.

FIG. 7 depicts an example encoding scheme of the charge rate data in accordance with some embodiments of the present disclosure. FIG. 8 depicts example charge rate data encoding waveforms in accordance with some embodiments of the present disclosure.

In some embodiments, a given charge rate data is encoded using two sets of pulses. As shown in FIG. 7, a first set of the two sets comprises pulses 702 and 704 and a second set of the two sets comprises pulses 712 and 714. Pulses 702 and 704 are separated from each other by a time 740 (also denoted as $t_{1a}$). If pulses 702, 704, 712, and 714 comprise a valid encoding (e.g., an encoding recognizable by charging unit 216), then pulses 712 and 714 are also separated from each other by time 740. Pulse 704 is separated from pulse 712 by a separation time 742 (also denoted as $t_{reset}$). First and second sets of pulses are thus the same to complete a valid encoding.

In some embodiments, the separation time 742 comprises a time sufficient to not overload the diode 601 or 611 (e.g., based on diode operating characteristics) and depending on desired frequency of charge rate updates. For example, separation time 742 may be 300 millisecond (ms), approximately 300 ms, greater than 300 ms, or the like. As another example, a charge rate update sent every 5 seconds using 44 tones (4 bytes plus a stop bit, start bit, parity bit per byte) at 600 baud uses 1.5% of the total channel time.

In some embodiments, time 740 indicates the current command associated with the charge rate update being provided. For example, time 740 is configured to be between 51 ms to 76 ms, with 51 ms mapping to 0 Amp (A) and 76 ms mapping to 25 A and linearly interpolating in between at 1 A/ms. The end values may be clamped: 49-51 ms mapping to 0 A and 76-77 ms mapping to 25 A. Pulses having time 740 values outside these ranges may be ignored by charging unit 216.

An example waveform shape of pulses 702, 704 comprises a rectangular, square, or step up and step down waveform shape, as illustrated in FIG. 8. Any of a variety of other waveform shapes may also be possible. A pulse width 801 of each of pulses 702, 704 may be 1 ms. Pulses 702, 704, 712, 714 comprise voltage pulses, in which the magnitude of the pulse amplitude (e.g., voltage increase or voltage drop to the existing voltage level) may be a value sufficient to be distinguishable from noise and possible other signals present within the power provided in the power transmission path. For example, without limitation, pulse amplitude can be 0.2 to 3.0 V.

Returning to FIG. 7, pulses 722, 724 represent the first set of the two sets of pulses and pulses 732, 734 represent the second set of the two sets associated with the next charge rate update. Pulses 722, 724, 732, 734 may be similar to pulses 702, 704, 712, 714. Separation time 752 is similar to separation time 742. Time 750 is set in accordance with the particular charge rate update to be encoded based on the same mapping scheme as discussed above for time 740. Time 750 may thus be the same (if charge rate is unchanged from the last charge rate update associated with time 740) or different from time 740 (if charge rate has changed from the last charge rate update associated with time 740).

Returning to FIG. 5, the charge rate data transmitted in block 518 is received from the charging terminals 316 of UAV 100 to charging pad 130, and then from the charging pad 130 to the charging unit 216 at block 520. Pulses 802, 804 shown in FIG. 8 comprise a set of pulses 800 corresponding to respective pulses 702, 704 (or respective pulses 712, 714) as received at charging pad 130 or charging unit 216. Time 840 between pulses 802, 804 is the same as time 740. The shape, width, and/or height of pulses 802, 804 can be the same, different, or not well defined relative to pulses 702, 704. As an example, the height or amplitude of pulses 802, 804 (e.g., $V_d$) may be 200 milliVolt (mV), 1-2 V, or the like.

At least filters 400 of charging unit 216 is configured to perform processing of the received charge rate data, at block 522. As discussed above, processing may include removing noise, amplifying pulses 702, 704, 712, 714, and/or the like.

Next, microcontroller 404 of charging unit 216 is configured to determine if the processed charge rate data comprises a valid charge rate update, at block 524. The validity check may comprise one or more checks such as, but not limited to, checking whether time 740 is within a pre-set range (e.g., between 49 to 77 ms), whether separation timing between pulses 702, 704 and pulses 712, 714 are the same, if separation time 742 is within a pre-set range, if the magnitude of pulses 702, 704, 712, 714 are within a pre-set range, whether received pulses otherwise conform to expected pulses, and/or the like. If the received pulses are deemed to be invalid (no branch of block 524), then process 500 returns to block 520 to await the next charge rate update. If no received pulses are valid for several seconds (or some other pre-set timeout value), then charging unit 216 may be configured to time out. If the received pulses are deemed to be valid (yes branch of block 524), then process proceeds to block 526.

At block 526, microcontroller 404 is configured to determine adjustment or change, if any, to the voltage level to be outputted by the power source 218 in accordance with the received charge rate data and, optionally, a pre-determined charging/charge scheme. For instance, if the pre-determined charging scheme for batteries 300, 302 is a quick charge but the received charge rate data indicates that the batteries 300, 302 are not charging fast enough, then microcontroller 404 may command power source 218 to increase the voltage level by a certain amount.

Based on the processing or analysis performed by microcontroller 404 at block 526, microcontroller 404 is configured to generate a control signal or command, at block 528. Such control signal or command is transmitted to the power source 218. In response, the power source 218 is configured to output an appropriate voltage, at block 530. The voltage provided by the power source 218 at block 530 is received by the UAV 100, at block 504.

In some embodiments, after a charge rate signal is transmitted in block 518, the next charge rate signal is transmitted after a pre-set amount of time. For example, a charge rate update may be provided every 300 ms. As such, microcontroller 308 of UAV 100 can be configured to check whether enough time has lapsed to encode the next charge rate update, at block 532. If time has not lapsed (no branch of block 532), then process 500 returns to block 532. If sufficient time has lapsed (yes branch of block 532), then process 500 returns to block 504 to provide the next charge rate update. Such feedback loop is repeated throughout battery charging.

In some embodiments, charge rate signal or data referred to herein (such as the signal/data generated at block 516, transmitted at block 518, used to determine adjustment to power source output at block 526, updated at block 532, etc.) indicates current, voltage, battery charge rate, battery state information, or any other information associated with at least one of the batteries 300, 302 during charging and/or which can be used to regulate charging of the batteries by charging unit 216. Accordingly, charge rate signal or data may also be referred to as charge data, charge signal, battery charge data, battery charge signal, or a charge command.

In this manner, battery charge data to regulate charging of batteries included in UAV 100 can be generated and provided to a device separate from UAV 100. The power communication occurs on the same power transmission path/line as used to provide power to charge the batteries. Charge regulation components and functionalities can be excluded from UAV 100.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus comprising:
   a plurality of electrical contacts, wherein first and second electrical contacts of the plurality of electrical contacts are configured to electrically couple with a charging device external to the apparatus, wherein the apparatus comprises a vehicle;
   one or more rechargeable batteries configured to be charged with power received, via the first and second electrical contacts, from the charging device; and
   circuitry configured to obtain battery state information associated with the one or more rechargeable batteries during charging of the one or more rechargeable batteries and generate battery charge rate data based on the battery state information,
   wherein at least one of the first or second electrical contacts is coupled to the circuitry to transmit the battery charge rate data to the charging device over the at least one of the first or second electrical contacts used to receive the power for charging the one or more rechargeable batteries, and wherein the battery charge rate data is configured to be used by the charging device to regulate charging of the one or more rechargeable batteries.

2. The apparatus of claim 1, wherein the circuitry is further configured to encode the battery charge rate data in the power provided by the charging device over the first or second electrical contacts.

3. The apparatus of claim 1, wherein the circuitry comprises:
   a diode; and
   a first switch coupled in series with the diode,
   wherein the circuitry is configured to encode the battery charge rate data in the power by closing the first switch in a particular pattern.

4. The apparatus of claim 1, wherein the battery charge rate data is encoded using first, second, third, and fourth pulses, the first and second pulses separated by a first time, the third and fourth pulses separated by a second time, and the second and third pulses separated by a third time.

5. The apparatus of claim 4, wherein the first time indicates a current command associated with charging the one or more rechargeable batteries.

6. The apparatus of claim 4, wherein the circuitry is configured to indicate a validity of the battery charge rate data to the charging device by generating the first time equal to the second time.

7. The apparatus of claim 3, further comprising:
   a second switch coupled in parallel with the diode,
   wherein the circuitry is configured to open the second switch and close the first switch when encoding the battery charge rate data.

8. The apparatus of claim 1, wherein the first and second electrical contacts comprise fewer than all of the plurality of electrical contacts.

9. The apparatus of claim 1, wherein the vehicle comprises an unmanned aerial vehicle (UAV) and the charging device comprises a charging pad, and a power source, and wherein the first and second electrical contacts electrically couple with the charging pad when the UAV lands on the charging pad.

10. The apparatus of claim 1, wherein the circuitry is configured to periodically update the battery charge rate data.

11. The apparatus of claim 1, wherein the vehicle comprises an autonomous vehicle and the autonomous vehicle lacks circuitry for regulating a charging current or a charging voltage of the power for charging the one or more rechargeable batteries.

12. A system comprising:
    a charging pad;
    an unmanned aerial vehicle (UAV) including at least one rechargeable battery and a plurality of electrical contacts, wherein the UAV is configured to land on the charging pad and establish electrical contact between the charging pad and two or more electrical contacts of the plurality of electrical contacts;
    a power supply external to the UAV and electrically coupled to the charging pad, the power supply configured to provide power to the two or more electrical contacts of the plurality of electrical contacts, wherein the power charges the at least one rechargeable battery; and
    a charging unit external to the UAV and electrically coupled to the charging pad and the power supply, the charging unit configured to determine and control a level of the power provided by the power supply based on charge data associated with the at least one rechargeable battery that is generated by the UAV and communicated to the charging unit over at least one of the two or more electrical contacts used to provide the power for charging the at least one rechargeable battery.

13. The system of claim 12, wherein the UAV further includes circuitry configured to obtain battery state information associated with the at least one rechargeable battery during charging of the at least one rechargeable battery and generate the charge data based on the battery state information.

14. The system of claim 13, wherein the circuitry is further configured to encode the charge data in the power provided by the power supply.

15. The system of claim 13, wherein the power comprises a direct current (DC) current-controlled voltage, wherein the circuitry includes a switch coupled in series with a diode, and wherein the circuitry is configured to encode the charge data in the power by closing the switch in a particular pattern.

16. The system of claim 12, wherein the power supply comprises a direct current (DC) current-controlled voltage source.

17. The system of claim 12, wherein the charge data indicates at least one of a current, a voltage, a battery charge rate, battery state information associated with the at least one rechargeable battery during charging, or data usable by the charging unit to regulate charging of the at least one rechargeable battery.

18. The system of claim 12, wherein the charging unit is configured to determine a validity of the charge data by comparing time periods between pairs of pulses on the power.

19. The system of claim 12, wherein the charging unit is configured to leave the power unchanged when the charging unit determines the charge data is invalid by comparing times periods between pairs of pulses on the power.

20. The system of claim 12, wherein two or more of the charging pad, power supply, and charging unit comprises a unitary device.

\* \* \* \* \*